(12) United States Patent
Moore

(10) Patent No.: US 7,204,946 B2
(45) Date of Patent: Apr. 17, 2007

(54) METHOD FOR FORMING A GOLF BALL

(75) Inventor: Thomas E. Moore, Foxboro, MA (US)

(73) Assignee: Acushnet Company, Fairhaven, MA (US)

( * ) Notice: Subject to any disclaimer, the term of this patent is extended or adjusted under 35 U.S.C. 154(b) by 489 days.

(21) Appl. No.: 10/171,771

(22) Filed: Jun. 17, 2002

(65) Prior Publication Data
US 2003/0230825 A1    Dec. 18, 2003

(51) Int. Cl.
B29C 43/18    (2006.01)

(52) U.S. Cl. .................. 264/148; 264/209.4; 264/250; 264/275; 264/279.1; 264/325

(58) Field of Classification Search ............. 264/210.1, 264/210.2, 250, 271.1, 279.1, 320, 148; 425/461, 425/112, 113, 382.4, 467
See application file for complete search history.

(56) References Cited

U.S. PATENT DOCUMENTS

| | | | | |
|---|---|---|---|---|
| 695,867 | A | * 3/1902 | Kempshall | ................... 264/248 |
| 1,202,318 | A | * 10/1916 | Roberts | ....................... 473/367 |
| 4,065,537 | A | * 12/1977 | Miller et al. | ................ 264/143 |
| 4,165,877 | A | * 8/1979 | Miller et al. | ................ 473/372 |
| 4,398,000 | A | * 8/1983 | Kataoka et al. | ............. 525/437 |
| 4,501,715 | A | * 2/1985 | Barfield et al. | ............. 264/248 |
| 4,546,980 | A | * 10/1985 | Gendreau et al. | ........... 473/372 |
| 4,877,393 | A | * 10/1989 | Lo | .............................. 425/383 |
| 4,929,407 | A | * 5/1990 | Giza | .......................... 264/101 |
| 4,971,329 | A | * 11/1990 | Llort et al. | ................. 473/372 |
| 5,823,889 | A | * 10/1998 | Aoyama | ..................... 473/374 |
| 5,834,546 | A | * 11/1998 | Harris et al. | ................ 524/320 |

FOREIGN PATENT DOCUMENTS

GB     2125724 A    * 3/1984
JP     2000-342717 A    * 12/2000

OTHER PUBLICATIONS

English machine translation of JP 2000-342717 A, Sep. 2004, Japanese Patent Office website.*
"Rods and Irregular Profiles" Section; Plastics Engineering Handbook of the Society of the Plastics Industry, Inc.; 1976; Van Nostrand Reinhold Company; Fourth Edition; pp. 193-196.*

* cited by examiner

*Primary Examiner*—Edmund H. Lee
(74) *Attorney, Agent, or Firm*—Bingham McCutchen LLP

(57) ABSTRACT

A method and apparatus for forming a golf ball or components of a golf ball is disclosed. In one embodiment, a method includes the steps of forming a die having an opening having a perimeter comprising plurality of inwardly convex surfaces; preparing a golf ball component material; extruding the golf ball component material through the opening of the die to form a component prep; placing the component prep into a mold cavity; and molding the golf ball component. An apparatus for forming a golf ball may be configured in accordance with this method.

22 Claims, 12 Drawing Sheets

*Prior Art*

SECTION B-B

METHOD FOR FORMING A GOLF BALL

FIELD OF THE INVENTION

The invention relates to golf balls. More particularly, the invention relates to a method and apparatus for forming golf balls.

BACKGROUND OF THE INVENTION

Throughout its history, the golf ball has undergone an extensive evolution in an effort to improve its play-related characteristics, e.g., durability, distance, and control. Modern day golf balls can be classified as one-piece, two-piece, and three-piece (also known as "wound") balls. One-piece balls are formed from a homogeneous mass of material with a dimple pattern molded therein. One-piece balls are inexpensive and very durable, but do not provide great distance because of relatively high spin and low velocity.

Two-piece balls are the most popular types of ball in use today. They are made by molding a cover around a solid core. Three-piece or wound balls are made by molding a cover about a wound core. The cores, which may include one or more core layers, whether wound or solid, typically measure from 1.4 to 1.6 inches (3.5 to 4.1 cm) in diameter. The cover, which may include one or more cover layers, is molded about the core to form a golf ball having the minimum United States Golf Association (USGA) specified diameter of 1.68 inches (4.3 cm). Typically, the cover has a thickness of about 0.04 inches (0.1 cm). Two-piece balls typically have a hard "cutproof" cover which gives a longer distance ball, but which has lower spin rates, resulting in a decreased ability to control the ball.

Conventionally, the process of molding the cover about the core for both two-piece and three-piece golf balls includes one of two procedures: injection molding of fluid cover stock material around the core, which is held in a retractable pin mold; or by compression molding preformed half-shells about the core. The half-shells may be formed by forcing a prep material through an extruder die to form a shaped prep, and placing the shaped prep into a mold to form the half-shells. This procedure may be duplicated with respect to the one or more core layers, as well as other components of the golf ball, such as one or more cover layers.

FIG. 1 details one method known in the art for forming components of a golf ball, such as half-shells or a core or cover layer, via a compression molding process. In step 1 of this method, preps, or pieces of a material, are extruded into cylindrical shapes. After extrusion, the material is cut into desired lengths of preps and then loaded, in step 2, into jigs. A jig allows large numbers of preps to be held in the position and orientation needed in order to be place properly in a mold. For instance, the jig may be configured so that the preps may be loaded into a mold only in a particular orientation, such as orienting a cylindrical prep so that its curved portion contacts the lower portion of the mold. When loaded, the preps are positioned so that they form an array or matrix corresponding to the cavities of a mold plate.

In step 3, to facilitate fast production of the golf balls, the jigs are employed to rapidly load the preps into golf ball component molds. For instance, the jigs may have a mechanism that holds or grips the preps during transport from one work area to another, but quickly releases the preps once the jig is positioned over a mold plate. Once the preps have been loaded into the mold, the mold is then assembled and loaded into a mold press (step 4). In step 5, the press closes the mold to form the half-shells of golf balls, which may then be compression molded about the interior components of the golf ball.

One drawback with the above process is that the cylindrical preps must be properly oriented when loaded by the jig into the mold or else a volume of air may be trapped between a prep and mold. If air is trapped in the mold, a void will be introduced into the prep when the mold is compressed. For example, as shown in FIG. 2, where a cylindrical prep 20 is formed and positioned in mold 22 within mold cavity 24 with one of its flat faces pointed downward, the outer edges of that face will be in contact with the surface of mold 22 within mold cavity 24. If the core outer edge maintains contact, the prep will "trap" air between the surface of the face and mold cavity 24. When the mold press is closed onto mold 22, trapped air may produce voids in the outer surface of cylindrical prep 20.

Therefore, the jig or other device must perform the additional step of orienting the prep before loading it into the mold. Referring again to the example of cylindrical-shaped preps, the preps must first be oriented by the jigs so that they will not trap air when loaded into the mold. FIG. 3 shows an orientation of a cylindrical-shaped prep 20 that helps avoid the trapping of air when the mold press closes.

One disadvantage of the process described above is that the step of loading the preps into the jig so that all of the preps are oriented properly is a time consuming, manual processs. On occasion, this manual process can result in improper loading of a prep, which can lead to the mold defects described above. In addition, the preps can lose their proper alignment for a number of other reasons. Once loaded, for example, the mold may be moved or jarred so that a prep may move before the mold is closed. Removal of the jig also may cause a prep to become misaligned.

It would therefore be desirable to extrude preps shaped such that they would not require orientation before they were loaded into the mold. For example, preps formed with a non-cylindrical shape, such as a square-shape, would not require placement into the mold in a specific orientation, since no orientation of this shape would trap air between it and the mold. However, the extrusion process inhibits control over the shape of prep formed. This is explained as follows: rubber or polybutadiene or similar materials used to form components of the golf ball undergo thermal expansion as they exit an extruder die. Thus, these materials continue to deform after extrusion, forming a shape different than the shape of the opening at the die outlet end (i.e. the end of the die that the material exits). For example, where the die has a square-shaped opening at its outlet end, a prep forced through this die will thermally expand after extrusion, becoming rounded in shape. Depending upon the extent of expansion, this prep may ultimately form a shape that still remains highly sensitive to trapping air in the mold unless it has a particular orientation.

Therefore, there is a need for a system and method of forming a golf ball that overcomes the disadvantages that exist in the art.

There is also a need for a system and method of forming a golf ball component that can form preps shaped such that they need not have only one orientation in a mold cavity during molding in order to prevent the trapping of air in the mold. There is also a need for a system and method of forming a golf ball component that is less likely to trap air in a mold cavity based on the orientation of the component in the mold.

There is also a need for a system and method of forming desired shapes of materials that is able to compensate for thermal expansion of the materials during the extrusion process.

SUMMARY OF THE INVENTION

In one embodiment of the present invention, a method of forming a golf ball component includes the steps of forming a die having an opening with a perimeter comprising a plurality of inwardly convex surfaces; preparing a golf ball component material; extruding the golf ball component material through the opening of the die to form a component prep; placing the component prep into a mold cavity; and molding the golf ball component. By extruding the component material through the opening with inwardly convex edges, the die will be able to form component preps having three, four (e.g. cube), five or more sides, which cannot trap air when inserted into and pressed in a compression mold.

The component may be any part of a golf ball or any portion of any such part such as half of a single piece golf ball, core, core outer layer, inner cover layer, and/or cover.

The die may have an opening with a cross-section that is substantially circular at its inlet end and has a perimeter comprising three to five inwardly convex surfaces at its outlet end. Preferably, the die has an opening with a cross-section that is substantially circular at its inlet end and has a perimeter comprising four inwardly convex surfaces at its outlet end.

The opening of the die may have a predetermined first length equal to a first portion of the die, and an outlet section of substantially constant cross-sectional area. The die outlet section may have a second length, equal to a second portion of the die, that is less than about one-half the first length and greater than one-tenth the first length. The first length plus the second length equals the entire length of the extruder die.

In another embodiment, an extruder die for forming a golf ball component prep includes an opening that includes an inlet end and an outlet end, wherein the opening at the outlet end has a perimeter comprising inwardly convex surfaces.

A section, or specific length of the die opening terminating at the opening at the outlet end, may have a perimeter comprising a plurality of inwardly convex surfaces such that the cross-sectional area of the section is constant. The opening may also taper along the length of the die from the inlet end of the opening to a distance from the outlet end equal to the beginning of the section, i.e., to a distance equal to the length of the section. The cross-section of the length of the tapered opening may be inversely proportional to the distance from the inlet end. The length of the section may be between about 0.01 inch and 0.5 inch. The length of the section may be between about 0.01 inch and about 0.25 inch. The length of the section may be about 0.25 inch.

The opening of the extruder die at the outlet end may have a perimeter comprising three to five inwardly convex surfaces.

The opening may have a perimeter comprising four inwardly convex surfaces. The four inwardly convex surfaces may be configured such that a specific material extruded through the extruder die has an approximately square-shaped cross-section after completion of thermal expansion.

The opening near the outlet end having a perimeter comprising four inwardly convex surfaces may be symmetrical.

DETAILED DESCRIPTION OF THE PREFERRED EMBODIMENT

Figure 1:
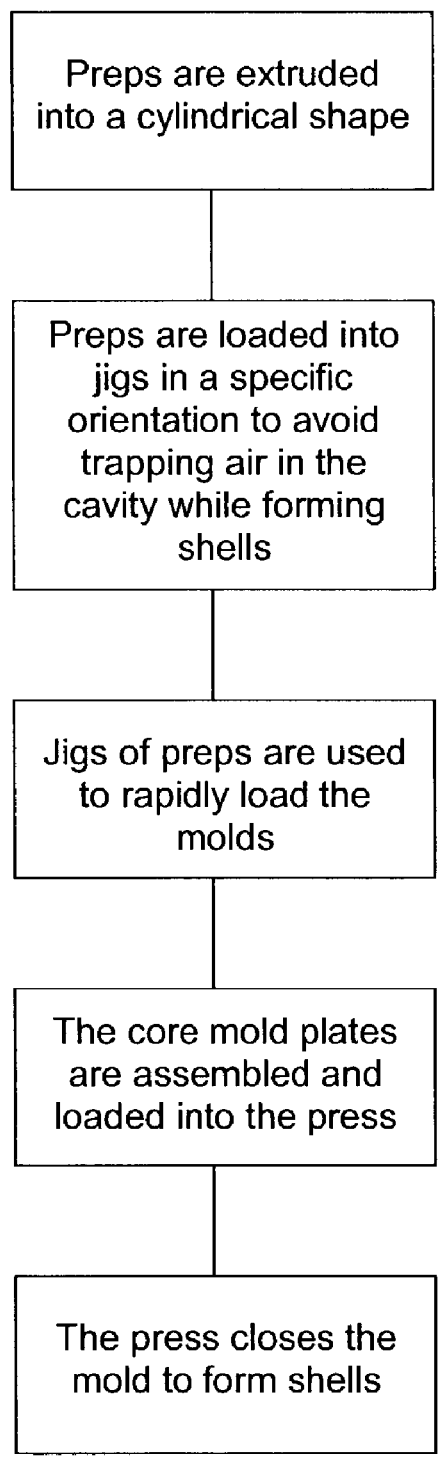
FIG. 1 is a flow chart describing a method of forming a component of a golf ball, as known in the art.
Figure 2:
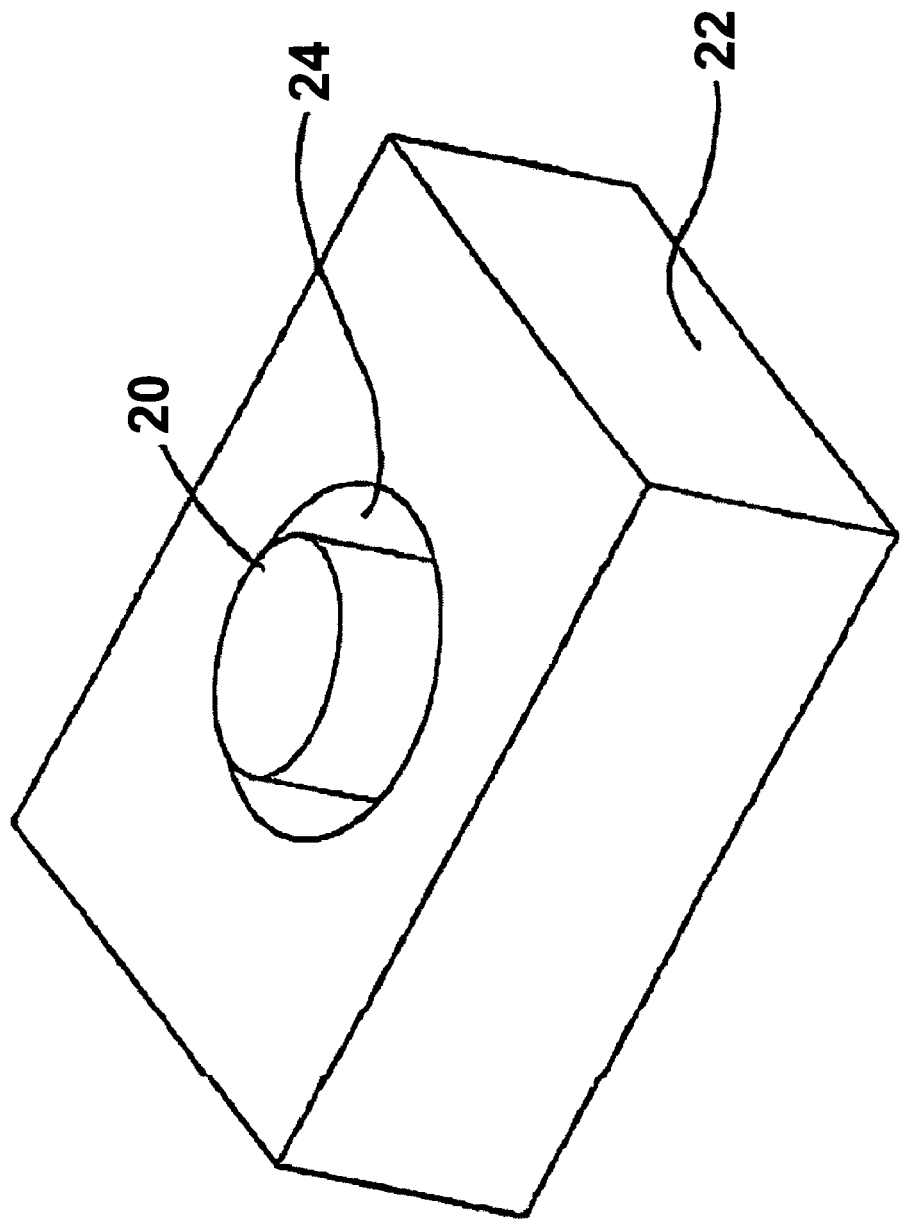
FIG. 2 shows a perspective view of a mold loaded by a golf ball component prep oriented to trap air during the compression molding process, as known in the art.
Figure 3:
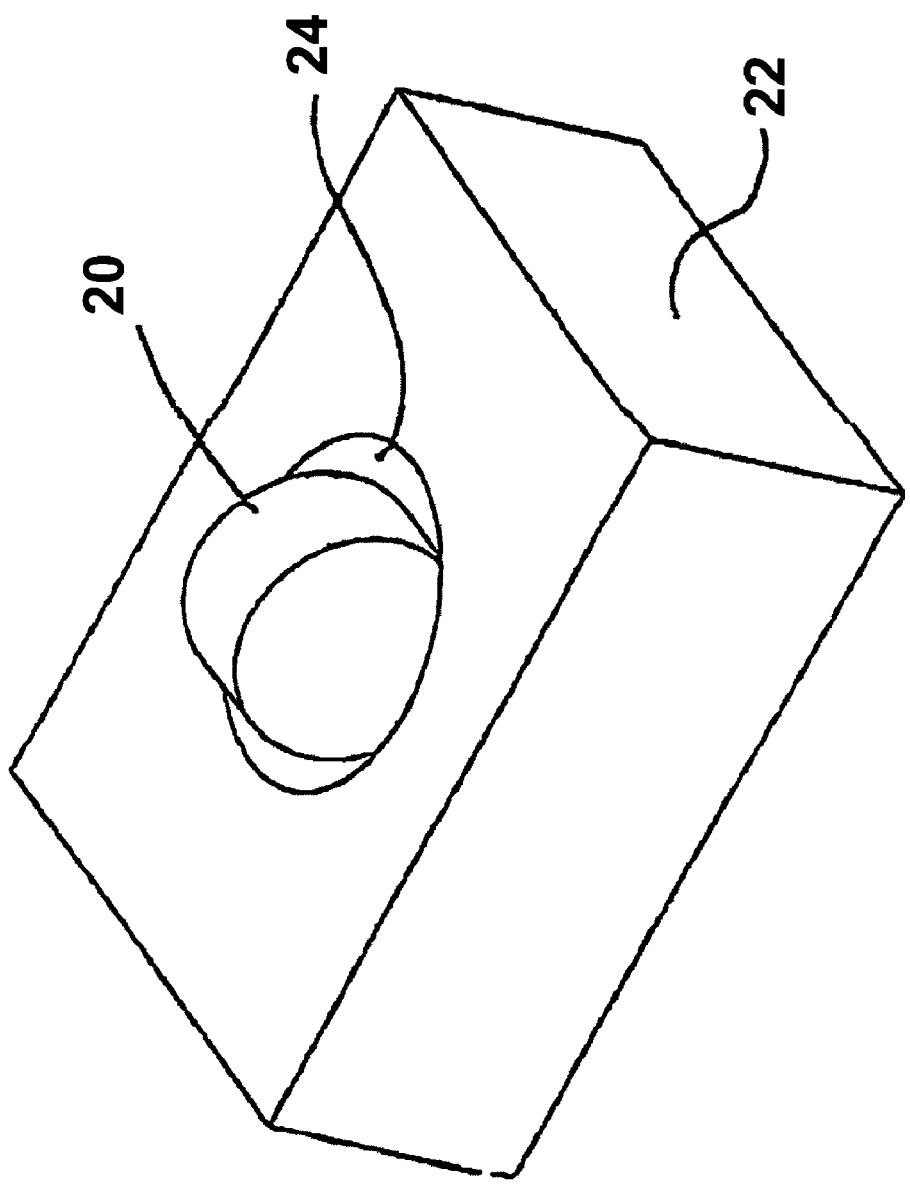
FIG. 3 shows a perspective view of a mold loaded by a golf ball component prep oriented to avoid the trapping of air during the compression molding process, as known in the art.
Figure 4:
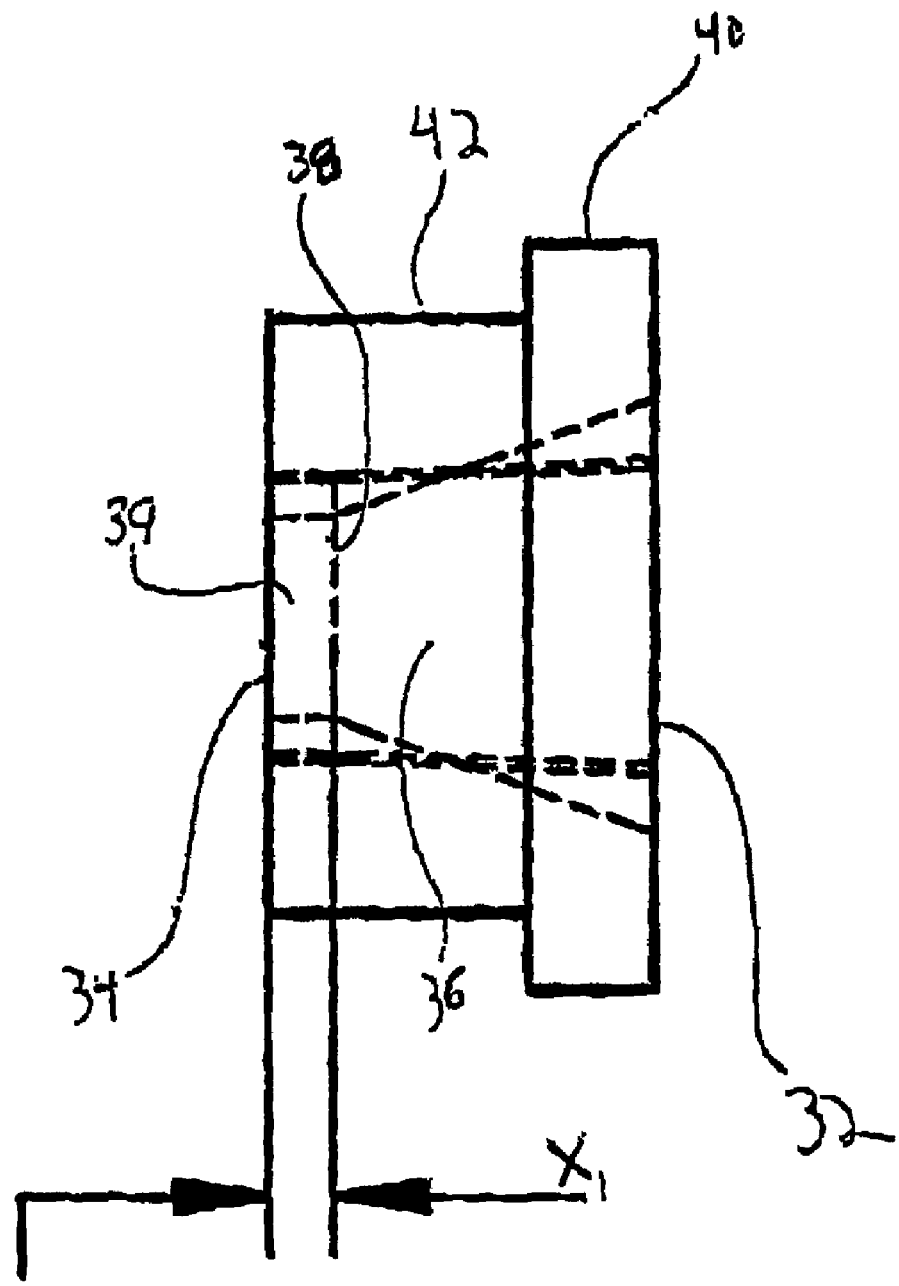
FIG. 4 shows a front view of an extruder die, in accordance with the present invention.

FIG. 4 shows a front view of an extruder die used in the process of forming component preps for use in producing golf balls, in accordance with the present invention. Extruder die 30 preferably includes first portion 40 having a first length and second portion 42 having a second length, wherein the first length plus the second length equals the entire length of die 30, and wherein each length is measured in the X-direction (i.e. direction along the X-axis and length of die 30). Preferably, the first length of first portion 40 is between about 0.01 inch and about 0.75 inch. More preferably, first length of first portion 40 is between about 0.1 inch and about 0.5 inch. Most preferably, the first length is about 0.25 inch.

Preferably, the length of second portion 42, or second length, is between about 0.1 inch and about 1.5 inches. More preferably, the second length of second portion 42 is between about 0.1 inch and about 1.0 inch. Most preferably, the second length is about 0.5 inch.

Preferably, the lengths of the second portion 42 and the first portion 40 are sized such that the first portion is less than approximately one-half the length of the second portion and greater than approximately one-tenth of the second portion.

Figure 5:
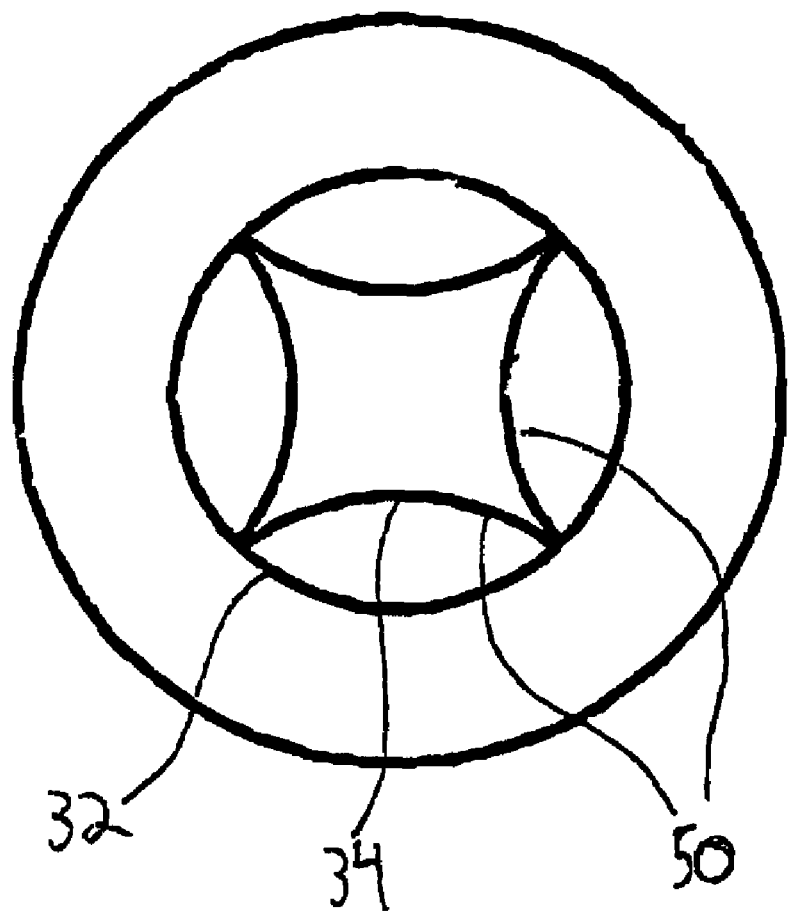
FIG. 5 shows a right side view, or inlet end, of the extruder die of FIG. 4.

Die 30 also includes opening 36, an aperture through which a material is extruded to form the component prep. During the extrusion process, a material is forced through opening 36, entering opening 36 at inlet end 32 (see FIG. 5) and exiting opening 36 at outlet end 34 (see FIG. 6).

Opening 36 has a cross-section that is preferably substantially circular except near outlet end 34.

Opening 36 also preferably tapers from inlet end 32 to a position a desired distance, in the X-direction, from outlet end 34. Preferably, if opening 36 tapers, its cross-section is inversely proportional to the distance in the X-direction from inlet end 32. In one embodiment, die 30 tapers from inlet end 32 to taper end 38, which is a distance X1 from outlet end 34 in the X-direction. Thus, outlet section 39, the section of opening 36 between taper end 38 and outlet end 34, has a length X1. Preferably, length X1 is between about 0.01 inch and about 0.5 inch. More preferably, length X1 is between about 0.01 inch and about 0.25 inch. Most preferably, length X1 is about 0.125 inch. In these embodiments, outlet section 39 preferably has a constant cross-section throughout its length X1, in terms of both area and shape.

The manner in which the opening is tapered from its starting shape on the inlet side of the die to the final shape at the outlet side can be accomplished in a number of ways. In one embodiment, for example, the taper of the opening from the inlet side toward the outlet side generally maintains a similar cross-sectional shape of the opening. In other words, the opening at the inlet side and outlet side of the die are generally similar in shape, albeit different in size, and a similar cross-sectional shape may be found for the opening at locations between the inlet and outlet side. In another embodiment, the inlet side of the die is circular and the taper gradually introduces the curvature of each side of the extruded material.

Figure 12:
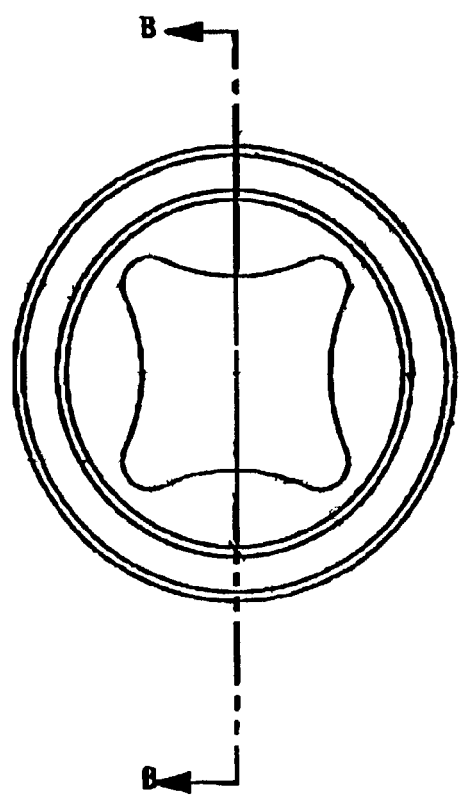
FIG. 12 shows a right side view, or inlet end, of an extruder die in accordance with the present invention.
Figure 13:
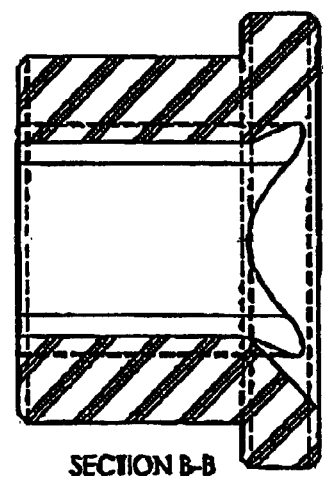
FIG. 13 shows a cross section of the extruder die of FIG. 12.
Figure 14:
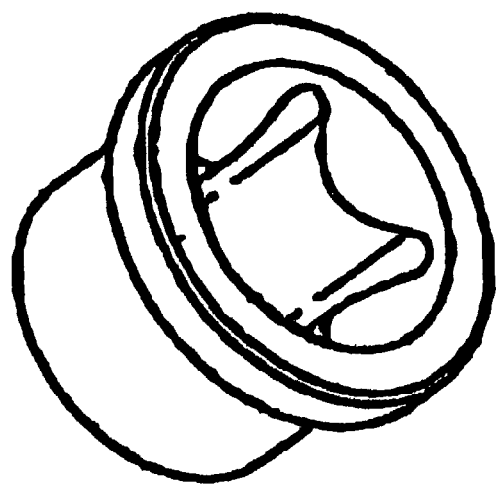
FIG. 14 shows a perspective view of the extruder die of FIG. 12.

In some cases, the way the opening is tapered from the inlet side to the outlet side, may allow for reduced manufacturing costs or allow for a greater variety of materials to be used. For instance, if the taper requires a wire EDM process in order to form it, the materials that could be selected to make the die would be limited to metals or similar materials suitable for this process. As shown in FIGS. 12–14, however, there are alternative designs that are relatively inexpensive to manufacture and provide greater flexibility in the materials that can be used to form the die. In this embodiment, the cross-sectional area of the outlet side of the opening is formed through the die from the inlet side to the outlet side without a taper. The die is then drilled or machined on the inlet side to form the taper. This process would allow the use of lower cost materials, such as nylons, teflon, for making the die.

Figure 6:
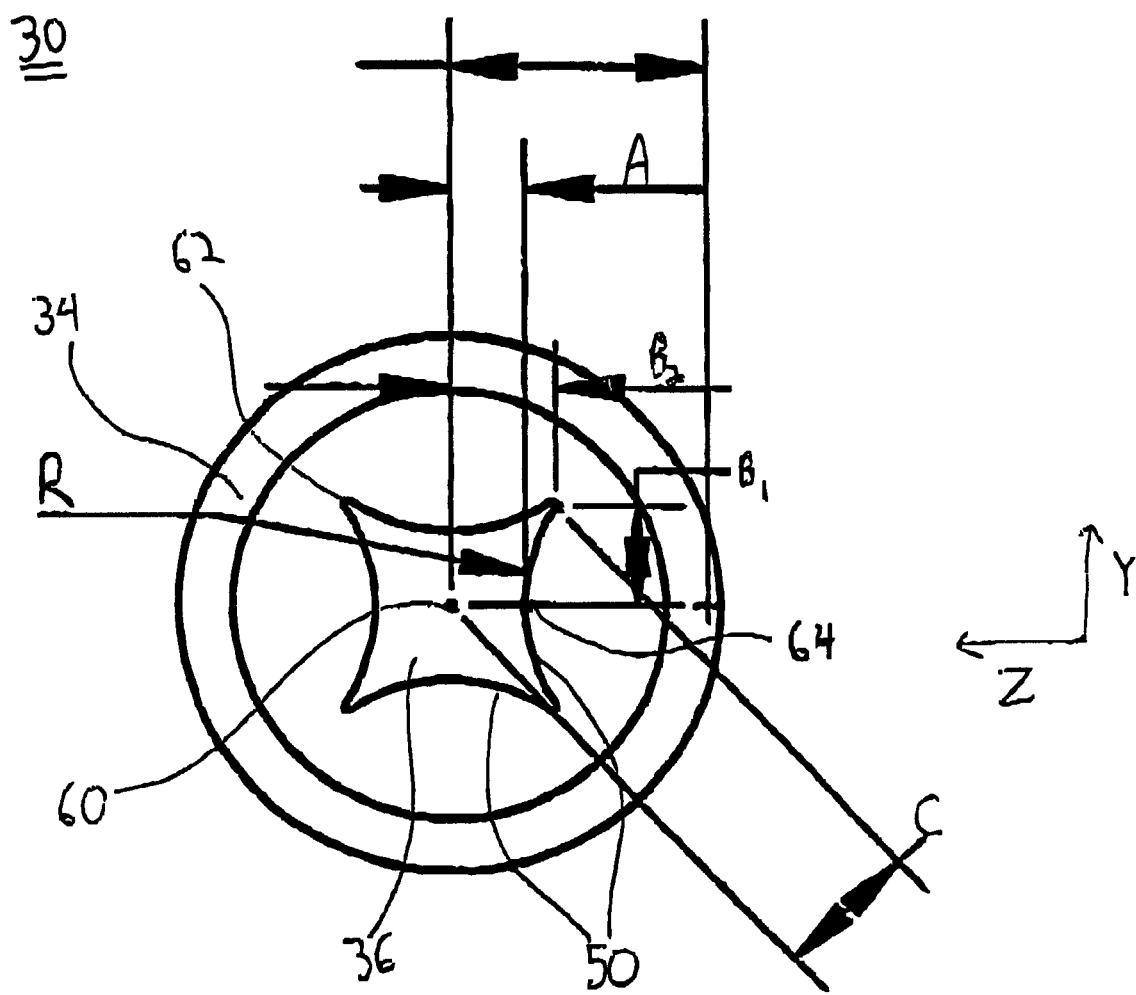
FIG. 6 shows a left side view, or outlet end, of the extruder die of FIG. 4.

Referring to FIG. 6 along with FIG. 4, opening 36 at outlet end 34 has a perimeter comprising a plurality of inwardly convex surfaces 50. Preferably, opening 36 at outlet end 34 has a perimeter comprising three or more inwardly convex surfaces 50. More preferably, opening 36 at outlet end 34 has a perimeter comprising three to five inwardly convex surfaces 50. Where a desire exists to form a prep with six sides (i.e. a material extruded through an opening with four inwardly convex surfaces 50 and then cut), such as a cube, the opening at outlet 34 has a perimeter comprising four inwardly convex surfaces 50. In the embodiment shown in FIG. 5, the opening at outlet end 34 has a perimeter comprising four equal-shaped, equal-sized, inwardly convex surfaces 50 positioned such that the cross-section of opening 36 at outlet end 34 is symmetrical about the Y and Z axes. However, inwardly convex surfaces 50 need not necessarily have equal shapes or sizes, or be positioned symmetrically to achieve the advantages of the present invention.

As mentioned above, one embodiment of the present invention forms a prep that is approximately the shape of a cube. That is, each side of the prep generally appears to have approximately the same dimensions as another face of the prep. One advantage of this configuration is that it may allow the preps to be placed within the cavities of the mold without requiring a particular orientation, or at least result in a prep that allows greater flexibility in orientation without causing air to be trapped in the mold during the molding process. The use of preps with lower likelihood of trapping air based on its orientation will in turn, reduces or eliminates the need for a jig to control the orientation of the preps before being placed in the mold cavities.

In addition to expanding radially outward from the axis in which it is extruded, the extruded material also may shrink, expand, warp or otherwise change shape along the face of the prep corresponding to the cut edges. For instance, the face of the prep that first exits the extruder may cool to form a cupped depression in the center of the face, while the face that exits the extruder last may bulge out from the center when cooled.

The degree to which the cut faces change in shape when cooled depends in part upon the type of material used. Some fillers, for instance, may be able to help reduce or control the degree that the cut faces change. Thus, it is possible to at least partially exaggerate or suppress the degree to which the cut faces change when cooled.

In addition, the change in shape of the cut faces also may be used to further help reduce the occurrence of trapped air in the mold. In particular, if a cut face cools to form a bulge near the center, this cut face may be placed generally facing down into the mold cavity so that the material extends toward or contact the cavity wall. When the mold is closed, the portion of the cut face extending toward the cavity wall will contact it near the bottom of the mold (i.e., near the pole of the cup that is formed after the material has been compression molded) and direct the air in the mold toward the parting line of the mold cavity where it can be easily vented.

Conversely, if a cut face cools to form a depression or dimple in the face of the prep, this side of the prep may be directed to face outward and away from the cavity wall. When the mold is closed, the protrusion from one mold plate that extends into the mold cavity of another mold plate will contact the depressed portion of the cut face and force the extruded material against the cavity wall. In contract, placing a cut face having a dimple or depression is placed against the mold cavity wall may increase the occurrence of trapped air and gases. One reason for this may be that once the material surrounding this depression contacts the mold cavity wall, any remaining air inside the dimpled portion of the cut face will be unable to escape to a part of the mold that can be vented.

Even when accounting for the possibility that one or more faces of the prep may change in shape when cooling to result in a face that is not generally flat, the use of the present invention still provides a prep with reduced requirements for orienting the prep before molding it. Thus, preps made according to the present invention have a lower sensitivity to orientation in order to avoid trapping air or other gases in the mold.

In the embodiment in which opening 36 at outlet end 34 is symmetrical about the Y and Z axes as described above, length A is the distance in either the Y or Z-direction between center 60 and the midpoint 64 of a convex surface 50, wherein midpoint 64 is equidistant from its adjacent corners 62. Preferably, midpoint 64 is the portion of convex surface 50 that is closest to center 60. Length A is preferably between about 0.15 inch and about 0.3 inch. More preferably, length A is between about 0.2 inch and 0.25 inch. Most preferably, length A is about 0.2 inch.

In the embodiment in which opening 36 at outlet end 34 has a perimeter comprising four inwardly convex surfaces 50, the length B1 in the Y-direction between center 60 of opening 36 of outlet end 34 and one of the corners 62 of opening 36 at outlet end 34 is preferably between about 0.2 inch and about 0.4 inch. More preferably, length B1 is between about 0.3 inch and about 0.35 inch. Most preferably, this distance is about 0.3 inch. Length B2 in the X-direction between center 60 of opening 36 at outlet end 34 and one of the corners 62 of opening 36 at outlet end 34 has the same preferred, more preferred, and most preferred lengths. Where opening 36 at outlet end 34 is symmetrical about the Y and Z axes as described above, length B2 in the Z-direction between the center 60 and one of the corners 62 of the opening 36 at outlet end 34 will be equal to length B1.

In the embodiment in which opening 36 at outlet end 34 is symmetrical about the Y and Z axes as described above, length C is the distance between center 60 and each corner 62 of the opening 36 of outlet end 34. Preferably, length C is between about 0.25 inch and 1.0 inch. More preferably, length C is between about 0.4 inch and 0.8 inch. Most preferably, length C is about 0.7 inch.

The inwardly convex surfaces 50 of opening 36 at outlet end 34 preferably have equal radii of curvature R. These radii of curvature R may be from about 0.3 to about 0.8 inch, but preferably is equal to about 0.5 inch. In the embodiment in which opening 36 at outlet end 34 is symmetrical about the Y and Z axes as described above, the radii of curvature R are preferably greater than about length A, both B1 and B2, or C. More preferably, radii of curvature R are greater than about two-times length A. Preferably, radii of curvature R are greater than about length B1 as well as length B2 and less than about two times length B1 as well as two times length B2. Preferably, radii of curvature R are greater than about distance C and less than about two-times distance C.

Also, distances A and B1 and/or B2 are preferably related such that distance A is greater than about one-half length B1 and/or B2, and less than about length B1 and/or B2.

Preferably, the openings at inlet end 32 and outlet end 34 are sized such that opening 36 at outlet end 34 has a cross-sectional area that is less than the cross-sectional area of opening 36 at inlet end 32. Preferably, to extrude large preps from die 30, the cross-sectional area of opening 36 at outlet end 34 is less than about 75% of the cross-sectional area of opening 36 at inlet end 34. Preferably, to extrude smaller preps, the cross-sectional area of the opening at outlet end 34 is less than about 50% of the cross-sectional area of opening 36 at inlet end 34.

Referring again to FIGS. 4 and 5, the opening at inlet end 32 has a cross-sectional area preferably ranging from about 0.3 in$^2$ to about 1 in$^2$. More preferably, the opening at inlet end 32 has a cross-sectional area ranging from about 0.5 in$^2$ to about 0.75 in$^2$. Most preferably, this cross-sectional area is 0.6 in$^2$.

Referring again to FIGS. 4 and 6, the opening at outlet end 34 has a cross-sectional area preferably ranging from about 0.1 in$^2$ to about 0.5 in$^2$. More preferably, the opening at outlet end 34 has a cross-sectional area of about 0.15 in$^2$ to about 0.35 in$^2$. Most preferably, this cross-sectional area is about 0.2 in$^2$.

To create a core or other component of a golf ball, a die shaped and configured in accordance with the present invention, such as one of the embodiments above, may be inserted into the head of an extruder. Referring back to the figures, a material may then be forced in the X-direction through die 30, entering inlet end 32 and exiting outlet end 34. Preferably, as known in the art, a cutter is placed at the head of the extruder, so that the extruded material may be cut into desired sizes of preps.

Figure 7:
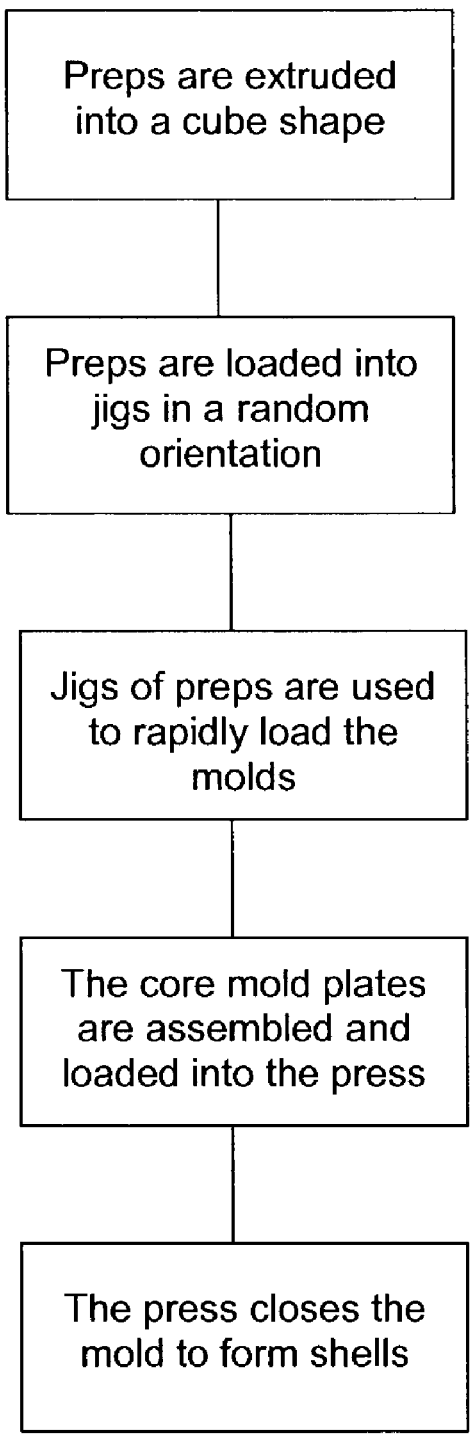
FIG. 7 is a flow chart describing a method of forming a component of a golf ball, in accordance with the present invention.

For example, as described in the flow chart in FIG. 7 with respect to the above embodiments and figures, in step 70, a material is extruded to form a prep. This step is described as follows: a die 30 having opening 36 with inlet end 32 and outlet end 34 such as described above may be inserted into the head of an extruder (not shown in the figures) such as a Davis Standard Extruder in which a cutter has been placed at its head, in proximity to outlet end 34. Then, in this step, a polybutadiene compound (or other material) may be forced through die 30, and then cut to form polybutadiene (or other material) pieces or preps. The opening 36 of outlet end 34 may be shaped such as described in the embodiments above, having a perimeter comprising four inwardly convex surfaces 50 so that expansion of the material upon exiting die 30 plus cutting of the material will result in component preps with approximately square-shaped cross-sections. The four inwardly convex surfaces 50 may be configured such that where a specific material, such as polybutadiene, is extruded through die 30, the material will have an approximately square-shaped cross-section after it completes thermal expansion. If desired, the material may be cut to form cube-shaped preps.

Alternatively, the extruded material may be cut so that the faces of the cut material are approximately square while the length of the sides along the extruded length of the prep are either shorter or longer than the length of a side of the square cross-section of the faces. Additionally, the extruded material may have a rectangular and be extruded to any desired length. These and other variations of prep size may be utilized depending on such considerations as the properties of the material that is being extruded, the molding conditions that the prep will be subjected to, and the like.

By shaping the prep as a cube or other six-sided prep with a square or rectangular-shaped cross-section, the prep may be loaded into a jig in step 72 without regard to the prep's orientation, since its shape will prohibit the trapping of air when loaded into a compression mold. Likewise, extruding a material through an extruder die 30 that has three, five, or more than five convex surfaces at outlet end 34 of opening 36 will allow the extruded material as cut into component preps to be loaded into jigs in random orientation, notwithstanding thermal expansion of the material. Additionally, other non-cylindrical shapes may be employed.

Figure 8:
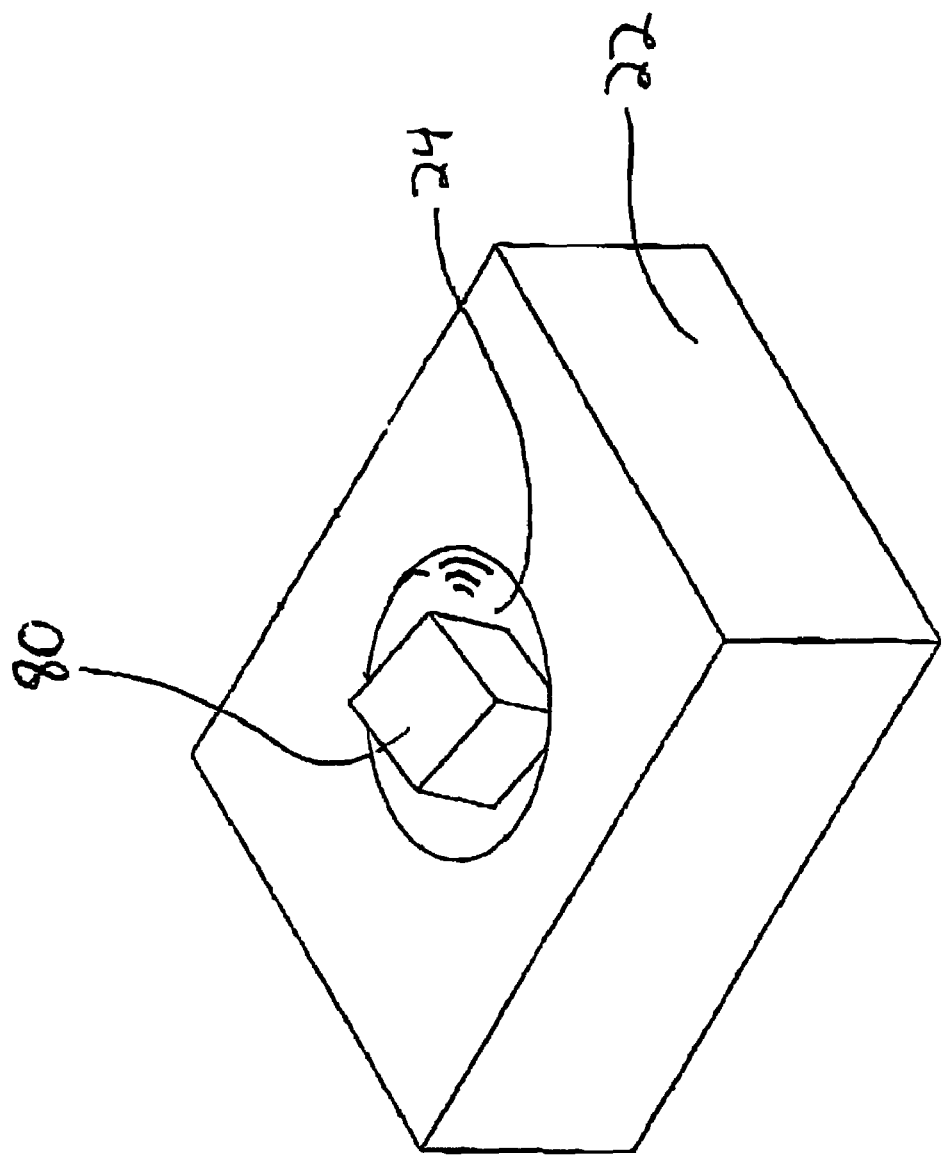
FIG. 8 shows a perspective view of a mold loaded by a golf ball component prep formed in accordance with the present invention.

Once the extruded material is cut into preps and the preps are each loaded into a jig, the jigs may be employed to rapidly load molds in step 74, as known in the art. As shown in FIG. 8, the non-cylindrical preps 80 may be loaded in any orientation into mold 22 by placing them into mold cavities 24 of molds 22.

Figure 9:
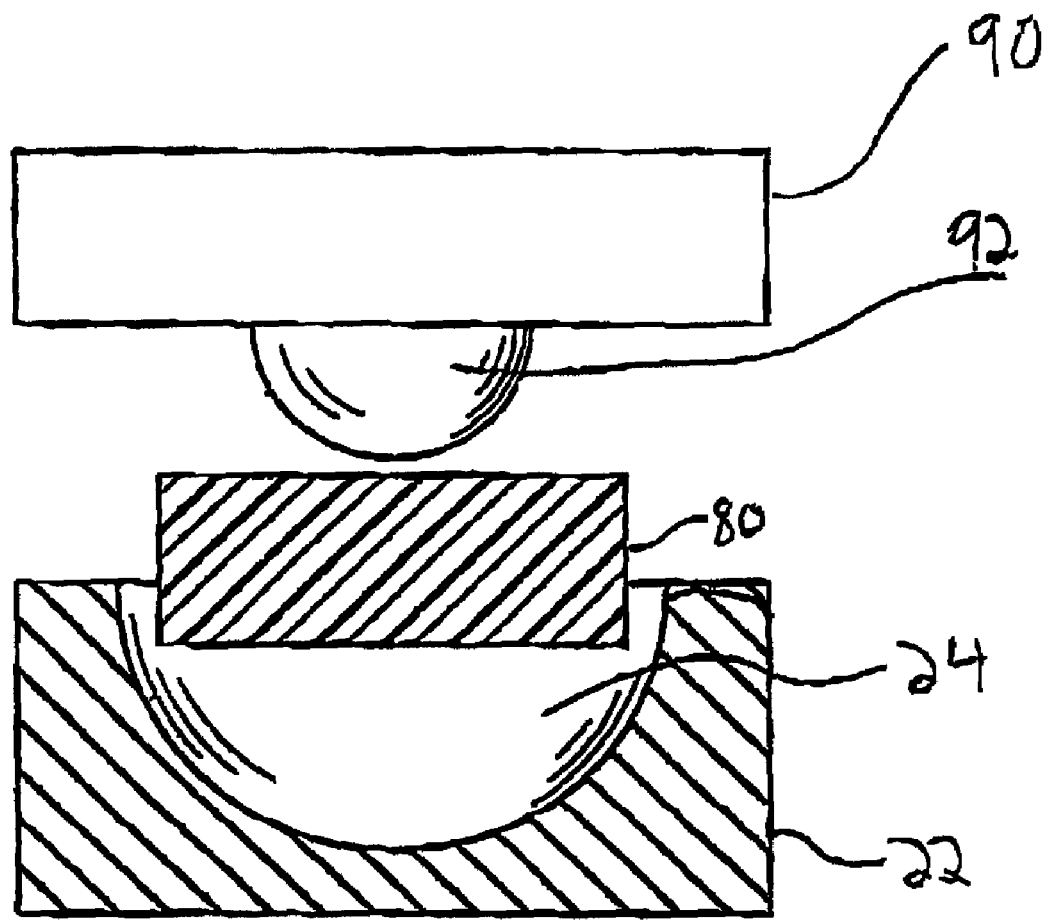
FIG. 9 shows the relative positioning of elements employed in compression molding golf ball components.

Then, in step 76, molds 22 are assembled and loaded into mold presses. This is shown in FIG. 9, which shows the relative positioning of the molds 22 with mold cavities 24, preps 80 and mold presses 90 including mold protrusions 92.

Then, in step 78, the mold presses 90 close the molds 22 to form the preps 80 into hemisphere shapes or half-shells.

Figure 10:
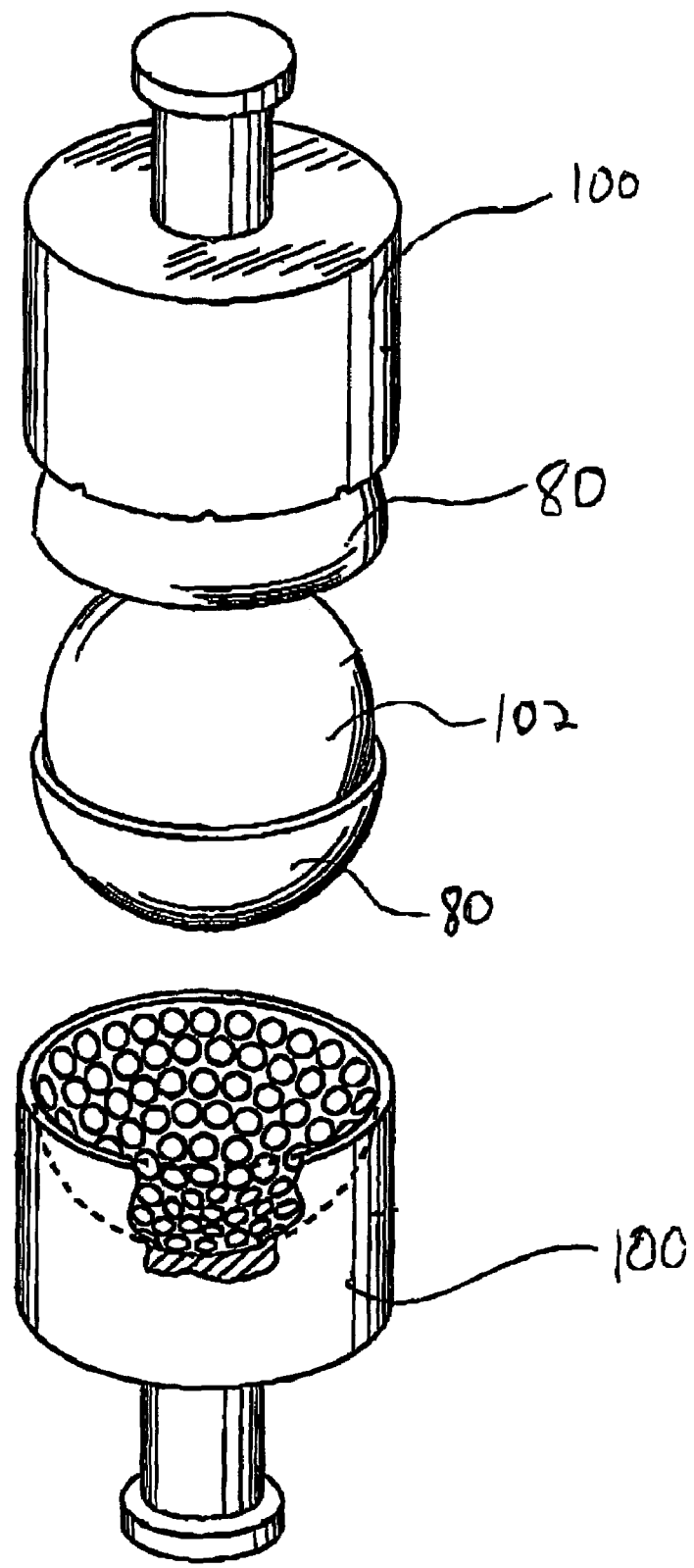
FIG. 10 shows the relative positioning of elements employed in compression molding multiple golf ball components to form a golf ball.

As shown in FIG. 10, for the example described above, mold presses 100 may be employed to form the dimples on half-shells 80 and to compression mold half-shells 80 and inner core 102. With regard to formation of a single golf ball, two half-shells 80 are positioned around inner core 102 and pressed against each other and inner core 102 by mold presses 100.

Figure 11:
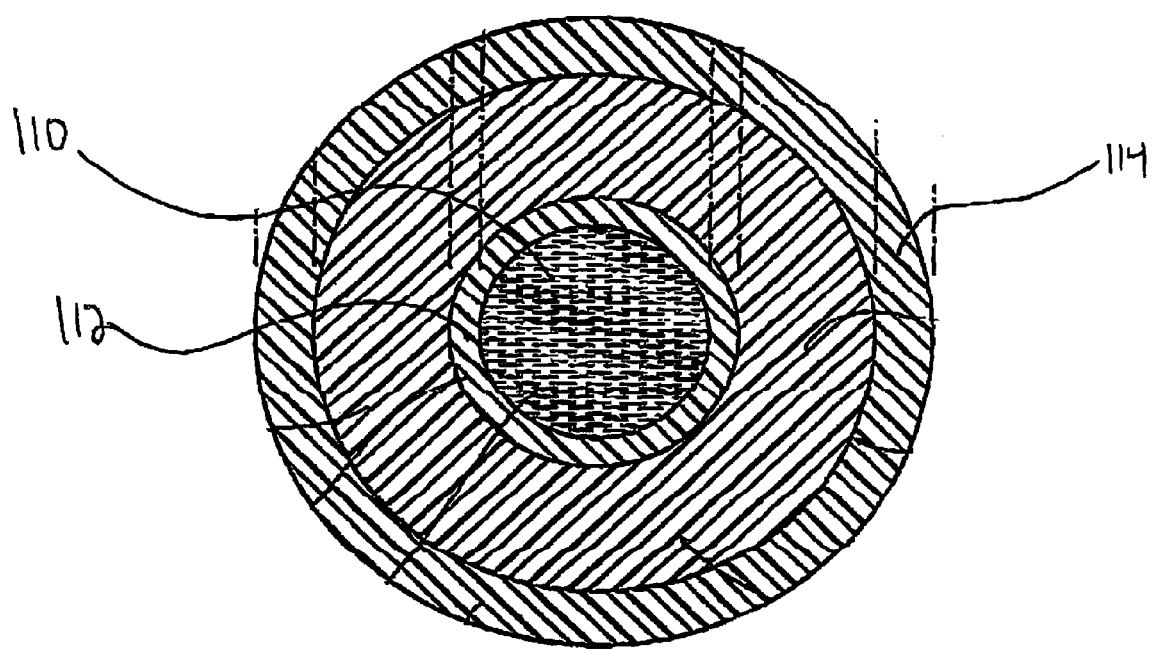
FIG. 11 shows a cross-section of a golf ball, as known in the art.

Note that although the above example shows the present invention in use for forming half-shells of a golf ball, the present invention may also be employed to form other components of the golf ball by employing the extruded, cut prep in different molds in methods and apparatuses known in the art. Thus, for example, the present invention may be employed to create all or part, such as a half, of cores, including inner, intermediate, and outer core layers, covers, including inner and outer covers, and other components of a golf ball, including a single piece, or half of a single piece, golf ball. Thus, for example, as shown in FIG. 11, the method and apparatus of the present invention may be employed to form part or all of inner core 110, outer core 112, or cover 114.

While various descriptions of the present invention are described above, it should be understood that the various features of each embodiment can be used singly or in any combination thereof. Therefore, this invention is not to be limited to only the specifically preferred embodiments depicted herein. Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A method of forming a golf ball component comprising the steps of:
   (a) forming a die having an opening having a perimeter comprising a plurality of inwardly convex surfaces;
   (b) extruding a golf ball component material through the opening of the die to form a component prep, wherein the component prep has six sides having approximately the same dimensions;
   (c) placing the component prep into a jig at a random orientation;
   (d) loading the jig into a mold; and
   (e) molding the component prep into a golf ball component.

2. The method of claim 1, wherein the golf ball component is at least a portion of a single piece golf ball.

3. The method of claim 1, wherein the golf ball component is at least a portion of a core.

4. The method of claim 1, wherein the step of molding comprises forming the component prep into a hemisphere shape.

5. The method of claim 4, wherein the hemisphere shape forms a portion of a cover.

6. The method of claim 1, wherein the die has an opening with a cross-section that is substantially circular at its inlet end and has a perimeter comprising three to five inwardly convex surfaces at its outlet end.

7. The method of claim 1, wherein the die has an opening that is substantially circular at its inlet end and has a perimeter comprising four inwardly convex surfaces at its outlet end.

8. The method of claim 1, wherein the opening of the die has a predetermined first length and an outlet section of substantially constant cross-sectional area.

9. The method of claim 8, wherein the die outlet section has a second length that is less than about one-half the first length and greater than one-tenth the first length.

10. A method of forming a golf ball component comprising the steps of:
    (a) forming a die having an opening having a perimeter comprising a plurality of inwardly convex surfaces;
    (b) extruding a material through the opening of the die to form a plurality of preps, wherein each prep comprises six sides;
    (c) loading each prep into a jig at a random orientation and placing the jig into a mold cavity;
    (d) molding each prep into a half shell;
    (e) positioning two half shells around an inner core; and
    (f) pressing the two half shells against each other and the inner core.

11. The method of claim 10, wherein the step of pressing the two half shells further comprises forming dimples on the two half shells.

12. The method of claim 10, wherein the die has an opening with a cross-section that is substantially circular at its inlet end and has a perimeter comprising three to five inwardly convex surfaces at its outlet end.

13. The method of claim 10, wherein the die has an opening that is substantially circular at its inlet end and has a perimeter comprising four inwardly convex surfaces at its outlet end.

14. The method of claim 10, wherein the opening of the die has a predetermined first length and an outlet section of substantially constant cross-sectional area.

15. The method of claim 14, wherein the die outlet section has a second length that is less than about one-half the first length and greater than one-tenth the first length.

16. The method of claim 10, wherein each prep has an extruded length that differs from the length of a side of a square cross-section of a face of the prep.

17. A method of forming a golf ball component comprising the steps of:
    (a) forming a die having an opening with a perimeter comprising three to five convex surfaces;
    (b) extruding a material through the opening of the die to form a prep, wherein the prep has six sides and a square-shaped or rectangular-shaped cross-section;
    (c) loading the prep into a jig at a random orientation and placing the jig into a mold; and
    (d) molding the prep into a golf ball component.

18. The method of claim 17, wherein the step of molding the prep into a golf ball component comprises forming a hemisphere shape.

19. The method of claim 17, wherein the die has an opening with a cross-section that is substantially circular at its inlet end and has a perimeter comprising three to five inwardly convex surfaces at its outlet end.

20. The method of claim 17, wherein the die has an opening that is substantially circular at its inlet end and has a perimeter comprising four inwardly convex surfaces at its outlet end.

21. The method of claim 17, wherein the opening of the die has a predetermined first length and an outlet section of substantially constant cross-sectional area.

22. The method of claim 21, wherein the die outlet section has a second length that is less than about one-half the first length and greater than one-tenth the first length.

* * * * *